US010807543B2

(12) United States Patent
Toyoshima et al.

(10) Patent No.: US 10,807,543 B2
(45) Date of Patent: Oct. 20, 2020

(54) WIRE HARNESS

(71) Applicant: Hitachi Metals, Ltd., Tokyo (JP)

(72) Inventors: Naoya Toyoshima, Tokyo (JP); Hajime Maejo, Tokyo (JP); Takahiro Futatsumori, Tokyo (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 16/392,320

(22) Filed: Apr. 23, 2019

(65) Prior Publication Data

US 2019/0351845 A1 Nov. 21, 2019

(30) Foreign Application Priority Data

May 18, 2018 (JP) ................................. 2018-096382

(51) Int. Cl.
*B60R 16/02* (2006.01)
*H01R 13/52* (2006.01)
(Continued)

(52) U.S. Cl.
CPC ....... *B60R 16/0215* (2013.01); *H01B 7/0045* (2013.01); *H01R 13/5205* (2013.01);
(Continued)

(58) Field of Classification Search
CPC ............ B60R 16/0207; B60R 16/0215; B60R 16/0222; H01B 7/0045; H01B 7/28;
(Continued)

(56) References Cited

U.S. PATENT DOCUMENTS 3,617,614 A 11/1971 Henry
4,288,107 A * 9/1981 Schwartze .............. F16L 39/00
285/123.2
(Continued)

FOREIGN PATENT DOCUMENTS

JP 2016-162584 A 9/2016

OTHER PUBLICATIONS

United States Office Action dated Aug. 30, 2019 in U.S. Appl. No. 16/391,442.
(Continued)

*Primary Examiner* — Paresh H Paghadal
(74) *Attorney, Agent, or Firm* — McGinn I.P. Law Group PLLC.

(57) ABSTRACT

A wire harness includes a cable that includes electric wires and a sheath covering the electric wires and is arranged so that the electric wires are exposed from an end portion of the sheath, a housing that accommodates the electric wires exposed from the end portion of the sheath, wire seal members arranged inside the housing to seal between the electric wires and the housing, a holder that includes an elastic body, a cylindrical sheath-side cylinder portion including an inner circumferential surface in contact with an outer circumferential surface of the sheath, and a cylindrical housing-side cylinder portion in contact with an outer circumferential surface of the housing, the sheath-side cylinder portion and the housing-side cylinder portion being integrally formed, and a first pressing member that presses the housing-side cylinder portion toward the housing and thereby fixes the housing-side cylinder portion to the housing.

19 Claims, 8 Drawing Sheets

(51) Int. Cl.
  *H02G 3/32* (2006.01)
  *H01B 7/00* (2006.01)
  *H02G 3/22* (2006.01)
  *H02G 3/04* (2006.01)

(52) U.S. Cl.
  CPC ....... *H01R 13/5213* (2013.01); *H02G 3/0406* (2013.01); *H02G 3/22* (2013.01); *H02G 3/32* (2013.01); *B60R 16/0207* (2013.01); *B60R 16/0222* (2013.01); *H01R 13/5208* (2013.01); *H01R 13/5221* (2013.01)

(58) Field of Classification Search
  CPC ...... H01B 7/282; H01B 7/2825; H01B 17/50; H01B 17/58; H01B 17/583; H01R 13/52; H01R 13/5221; H01R 13/5205; H01R 13/5208; H01R 13/5213; H02G 3/04; H02G 3/0406; H02G 3/22; H02G 3/32
  See application file for complete search history.

(56) References Cited

U.S. PATENT DOCUMENTS

| | | | | |
|---|---|---|---|---|
| 4,625,073 | A * | 11/1986 | Breesch | B29C 61/0608 156/49 |
| 4,723,054 | A * | 2/1988 | Billet | H02G 15/18 174/74 R |
| 6,466,725 | B2 * | 10/2002 | Battey | G02B 6/4473 385/100 |
| 6,494,731 | B1 | 12/2002 | Suzuki | |
| 7,635,813 | B2 * | 12/2009 | Taylor | H02G 15/24 174/74 R |
| 9,059,534 | B2 * | 6/2015 | Endo | H01R 13/52 |
| 9,252,577 | B1 * | 2/2016 | Smith | H02G 15/076 |
| 10,003,141 | B2 | 6/2018 | Komori et al. | |
| 2007/0187144 | A1 | 8/2007 | Kato | |
| 2012/0298417 | A1 | 11/2012 | Kempeneers et al. | |
| 2013/0092433 | A1 * | 4/2013 | Hoshiyama | H02G 15/14 174/71 R |
| 2014/0011401 | A1 * | 1/2014 | Endo | H01R 13/5205 439/588 |
| 2015/0270628 | A1 | 9/2015 | Kalass | |
| 2015/0318679 | A1 * | 11/2015 | Nakai | H01R 13/5219 16/2.2 |
| 2015/0355213 | A1 | 12/2015 | Kobayashi et al. | |
| 2016/0339854 | A1 * | 11/2016 | Hayakawa | B60R 16/0215 |
| 2017/0313265 | A1 | 11/2017 | Shimizu et al. | |
| 2018/0019041 | A1 * | 1/2018 | Takahashi | H02G 3/22 |
| 2018/0048081 | A1 * | 2/2018 | Komori | H01R 4/70 |
| 2018/0138676 | A1 * | 5/2018 | Yabashi | B60R 16/0215 |
| 2019/0296538 | A1 * | 9/2019 | Andre | H02G 15/188 |

OTHER PUBLICATIONS

United States Notice of Allowance dated Aug. 21, 2019 in U.S. Appl. No. 16/392,308.

* cited by examiner

FIG.8

WIRE HARNESS

CROSS-REFERENCE TO RELATED APPLICATIONS

The present application is based on Japanese patent application No. 2018-096382 filed on May 18, 2018, the entire contents of which are incorporated herein by reference.

BACKGROUND OF THE INVENTION

1. Field of the Invention

The invention relates to a wire harness used in, e.g., a vehicle and routed in a region which can get covered with liquid such as water splash.

2. Description of the Related Art

JP 2016/162584 discloses a wire harness which is used in, e.g., a vehicle for power supply to electric parking brake and signal transmission.

The wire harness disclosed in JP 2016/162584 has a structure in which plural electric wires are branched and extend out of an end portion of a sheath, and a synthetic resin housing is attached to cover the area around the end portion of the sheath. A rubber plug for sheath and rubber plugs for electric wire, which have a cylindrical shape, are arranged inside the housing and prevent water from entering through a gap between the sheath and the electric wires. In addition, a synthetic resin cap is attached to the housing and prevents the rubber plugs for electric wire from slipping out.

The rubber plug for sheath is arranged at an end portion of the housing on the opposite side to the cap, and has plural inner lips in elastic contact with the outer circumferential surface of the sheath, plural outer lips in elastic contact with the inner surface of the housing, and an annular flange facing an end face of the housing. The flange functions as a stopper for the rubber plug for sheath when the rubber plug for sheath is pushed into the housing.

SUMMARY OF THE INVENTION

The electric wires or sheath of a vehicle wire harness may be subjected to vertical vibration while driving the vehicle. The wire harness disclosed in JP 2016/162584 may be subjected to a reduction in water tightness by that, e.g., when the housing is vibrated hard, the housing is separated or offset from the sheath.

It is an object of the invention to provide a wire harness that allows the water tightness thereof to be maintained even when being vibrated.

According to an embodiment of the invention, a wire harness comprises:
- a cable that comprises electric wires and a sheath covering the electric wires and is arranged so that the electric wires are exposed from an end portion of the sheath;
- a housing that accommodates the electric wires exposed from the end portion of the sheath;
- wire seal members arranged inside the housing to seal between the electric wires and the housing;
- a holder that comprises an elastic body, a cylindrical sheath-side cylinder portion comprising an inner circumferential surface in contact with an outer circumferential surface of the sheath, and a cylindrical housing-side cylinder portion in contact with an outer circumferential surface of the housing, the sheath-side cylinder portion and the housing-side cylinder portion being integrally formed; and
- a first pressing member that presses the housing-side cylinder portion toward the housing and thereby fixes the housing-side cylinder portion to the housing.

Effects of the Invention

According to an embodiment of the invention, a wire harness can be provided that allows the water tightness thereof to be maintained even when being vibrated.

DETAILED DESCRIPTION OF THE EMBODIMENTS

Embodiment

An embodiment of the invention will be described below in conjunction with the appended drawings.

Figure 1:
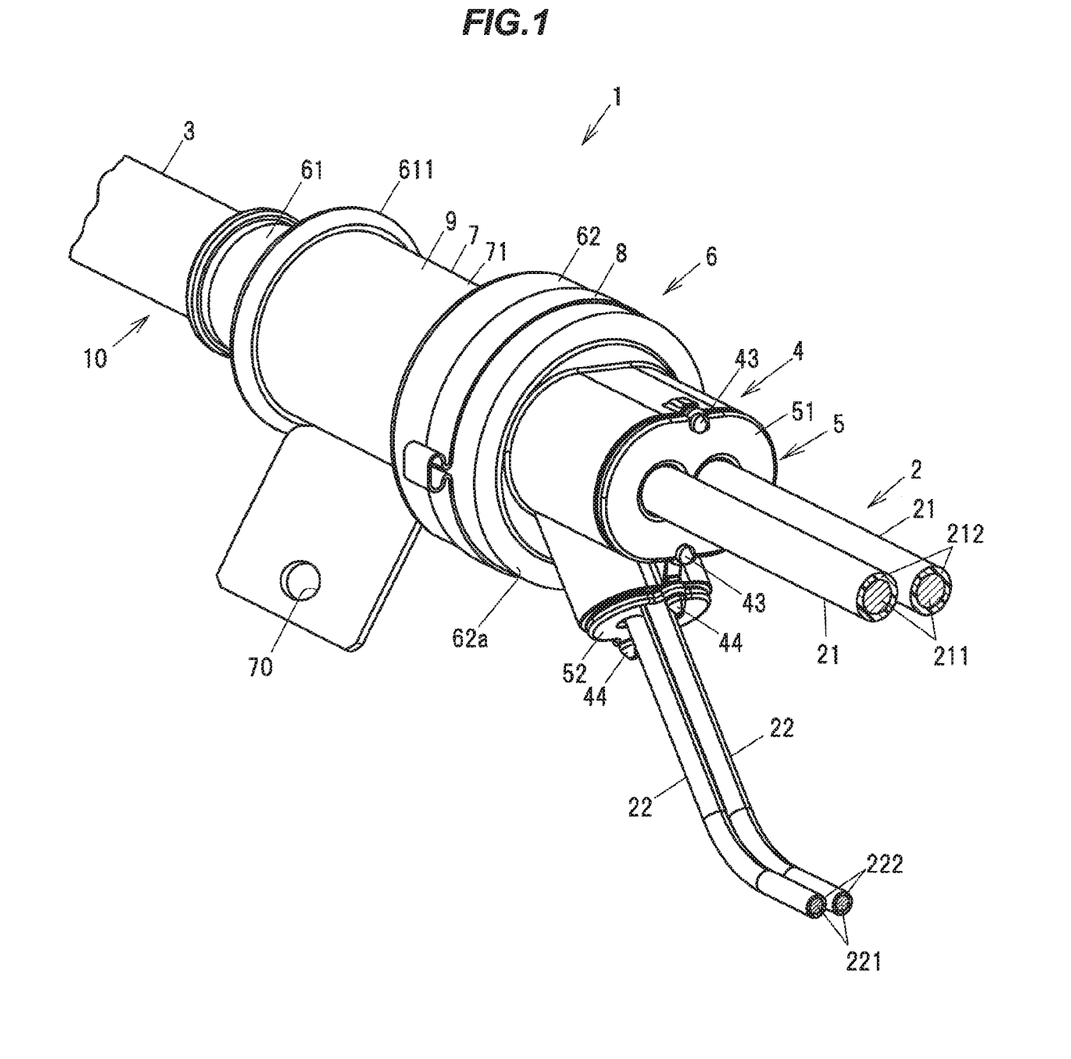
FIG. 1 is a perspective view showing a wire harness in an embodiment of the present invention.
Figure 2:
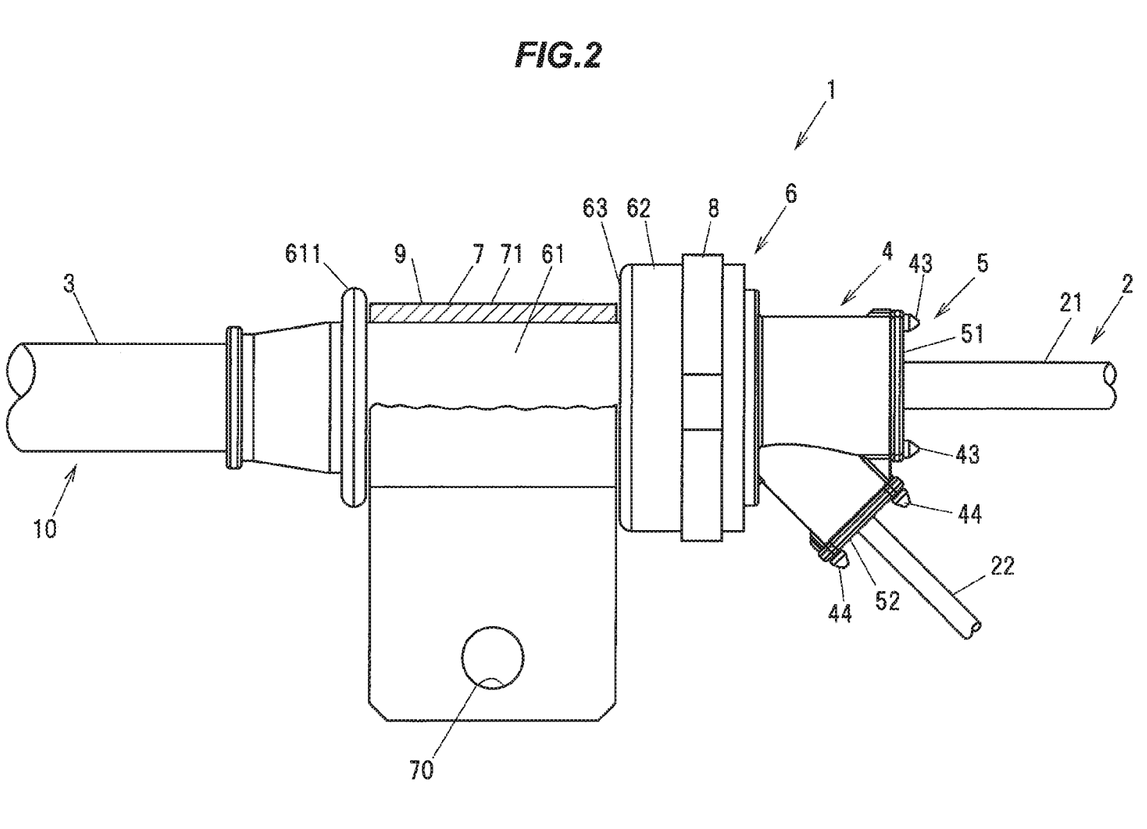
FIG. 2 is a side view showing the wire harness in which a fixing member is partially cutaway.
Figure 3A:
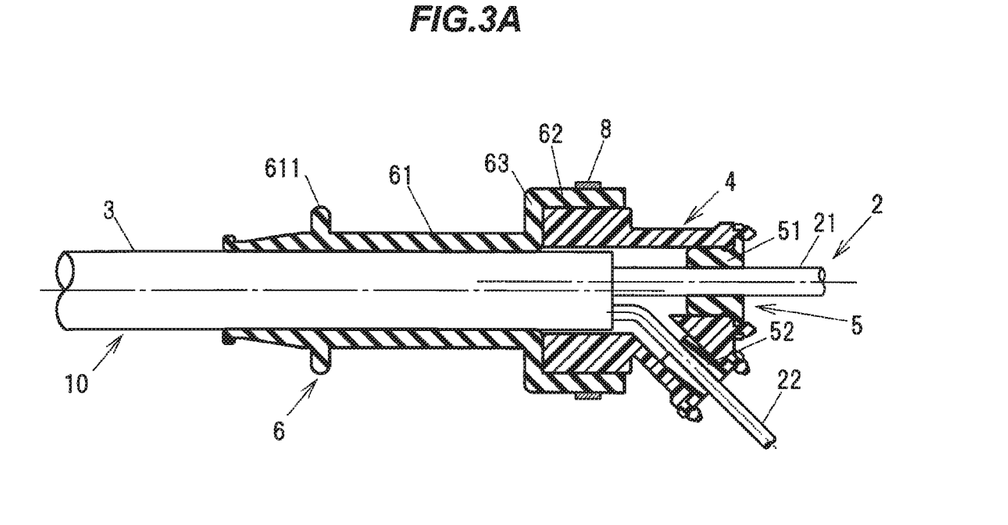
FIG. 3A is a cross sectional view showing the wire harness.
Figure 3B:
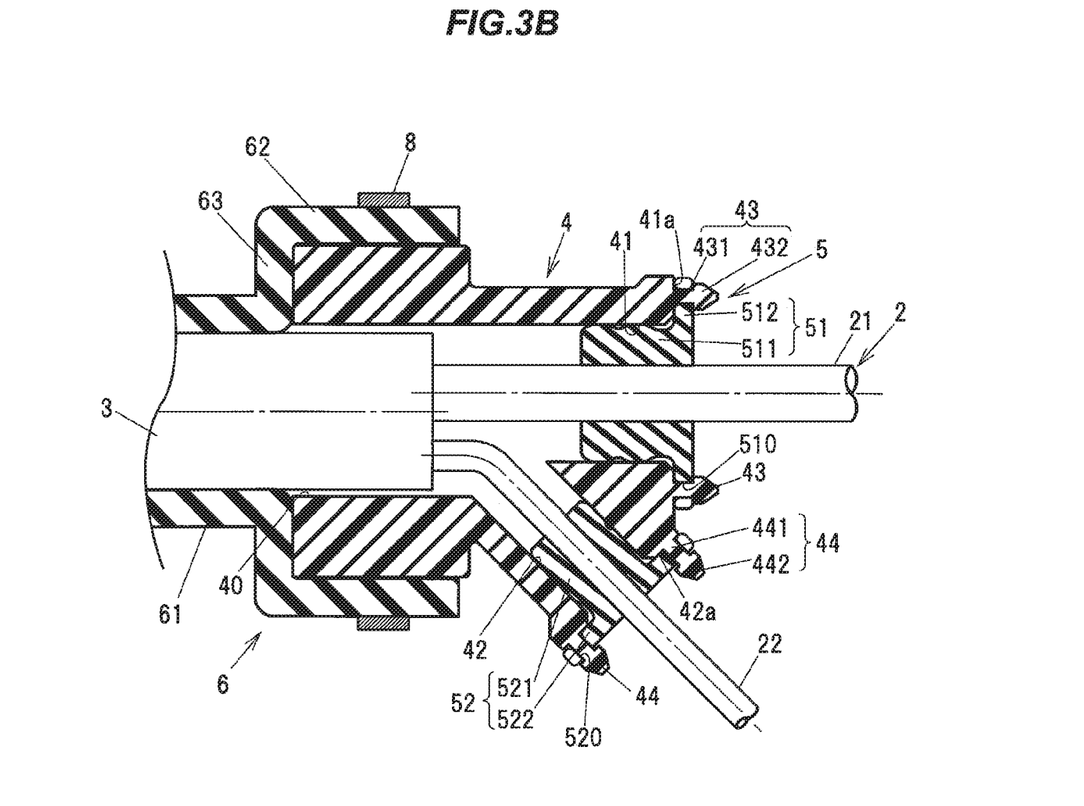
FIG. 3B is an enlarged view showing the main portion of FIG. 3A.
Figure 4:
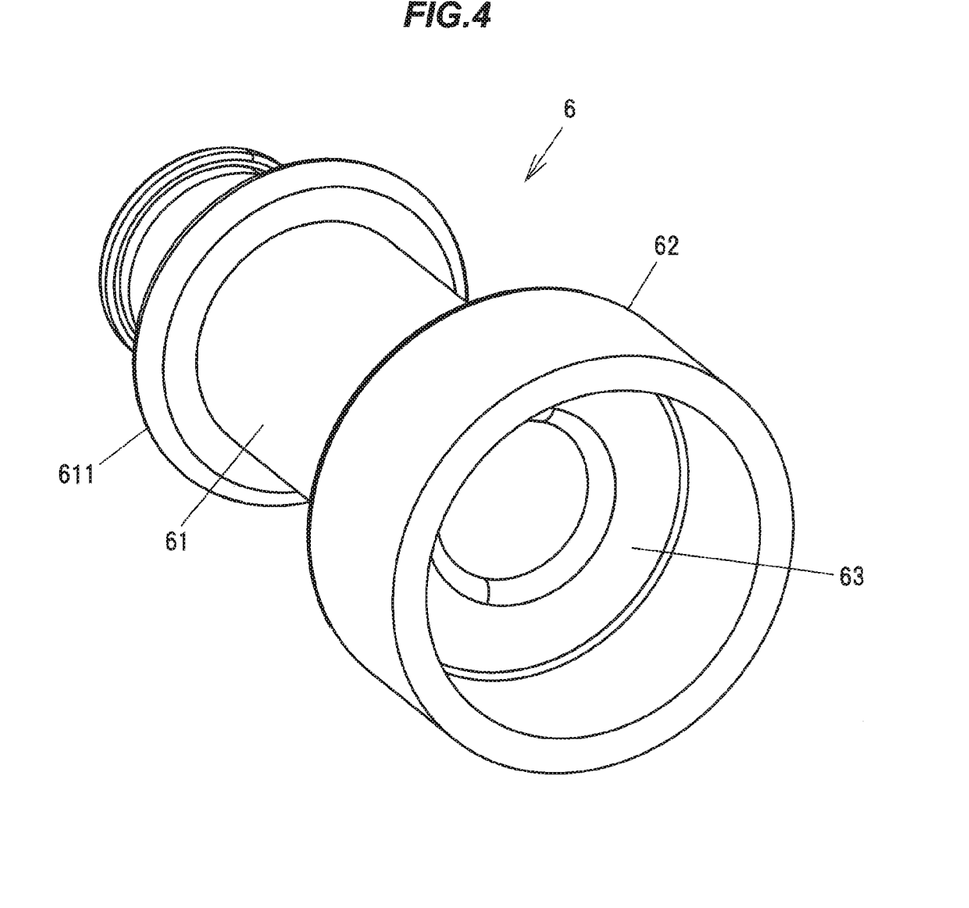
FIG. 4 is a perspective view showing a holder of the wire harness.
Figure 5:
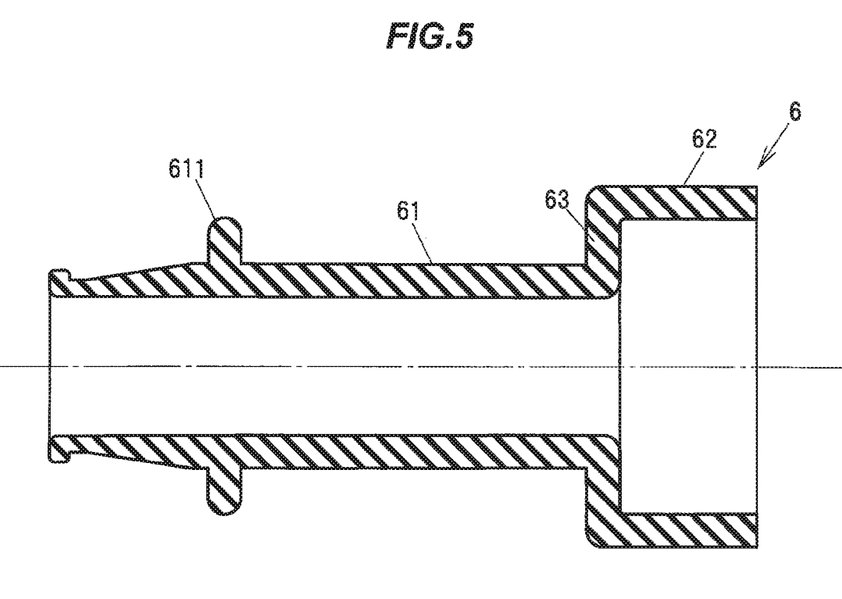
FIG. 5 is a cross sectional view showing the holder.
Figure 6:
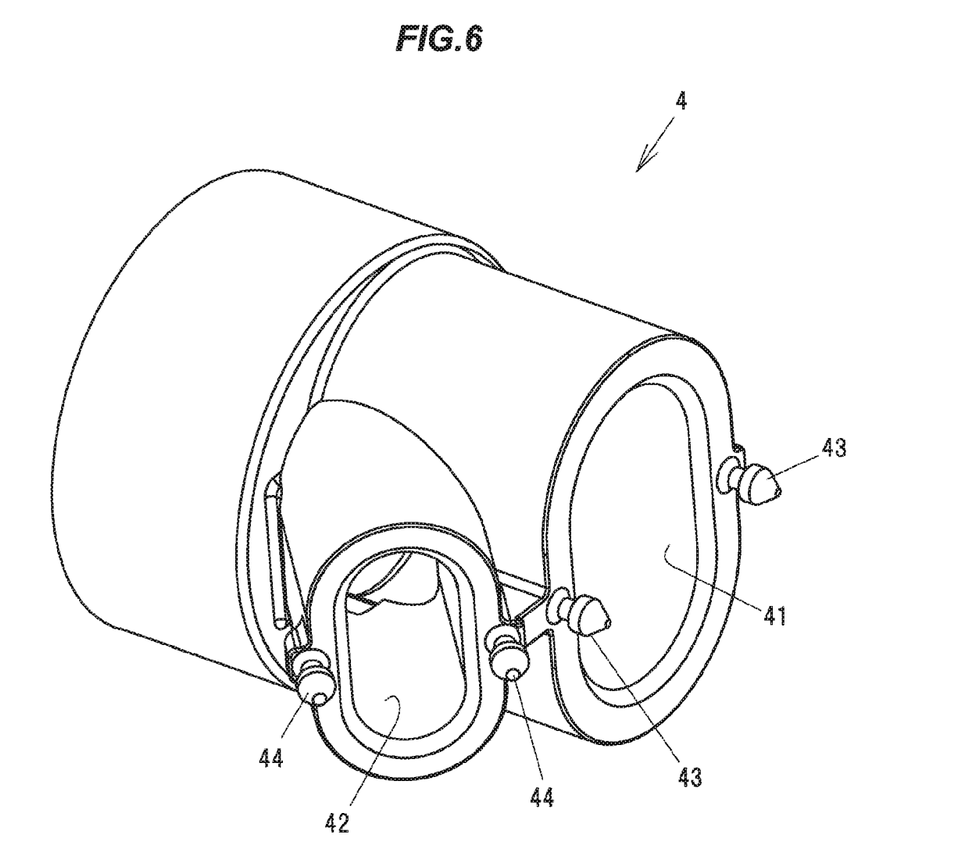
FIG. 6 is a perspective view showing a housing.
Figure 7:
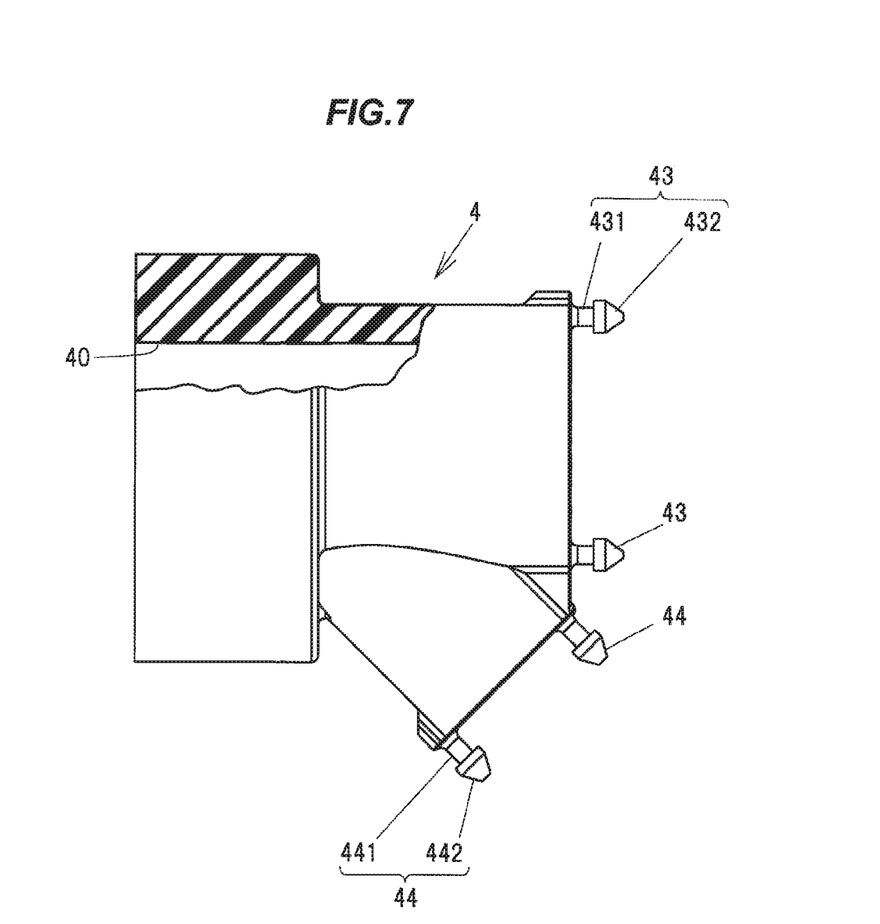
FIG. 7 is a side view showing the housing which is partially cutaway and shown as a cross section.

FIG. 1 is a perspective view showing a wire harness in the present embodiment. FIG. 2 is a side view showing the wire harness in which a fixing member is partially cutaway. FIG. 3A is a cross sectional view showing the wire harness and FIG. 3B is an enlarged view showing the main portion of FIG. 3A. FIG. 4 is a perspective view showing a holder of the wire harness. FIG. 5 is a cross sectional view showing the holder. FIG. 6 is a perspective view showing a housing. FIG. 7 is a side view showing the housing which is partially cutaway and shown as a cross section.

A wire harness 1 is used for electric parking brake device or electric brake device in automobile. In more detail, the wire harness 1 is used in an automobile to supply an operating current to activate an electric parking brake device provided on each wheel and to transmit a signal of a rotational speed sensor used for measuring the speed of a wheel rotation (a signal used in, e.g., anti-lock braking system (ABS)).

The wire harness 1 is provided with a cable 10 which has plural electric wires 2 and a sheath 3 covering the plural electric wires 2. In the present embodiment, the plural electric wires 2 consist of a pair of power lines 21 for supplying an operating current to the electric parking brake device and a pair of signal lines 22 for transmitting a signal from the rotational speed sensor.

The wire harness 1 is also provided with a housing 4 accommodating an end portion of the sheath 3 and the electric wires 2 (the pair of power lines 21 and the pair of signal lines 22) exposed therefrom, wire seal members 5 arranged inside the housing 4 to seal between the electric wires 2 and the housing 4, a cylindrical holder 6 formed of an elastic body, and a fixing member 7 for fixing the cable 10 to a fixing target (e.g., an automobile body). That is, the wire harness 1 in the present embodiment is a wire harness equipped with a fixing member.

Each of the pair of power lines 21 is an insulated wire in which a metal conductor 211 formed by twisting plural metal strands is covered with an insulation 212. An electric current output from a controller (not shown) is supplied to the electric parking brake device through the pair of power lines 21. Meanwhile, each of the pair of signal lines 22 is an insulated wire in which a metal conductor 221 formed by twisting plural metal strands is covered with an insulation 222. A signal output from the rotational speed sensor is transmitted to the controller (not shown) through the pair of signal lines 22. The metal conductor 211 of the power line 21 is thicker than the metal conductor 221 of the signal line 22.

The pair of power lines 21 and the pair of signal lines 22 are covered with the single sheath 3 in a longitudinal portion of the cable 10, and are exposed from an end portion of the sheath 3. The sheath 3 is pliable (flexible) enough to flexibly bend when routing the wire harness 1 in an automobile body, and the sheath 3 in the present embodiment is formed of a thermoplastic urethane. The outer shape of the sheath 3 in the cross section orthogonal to the longitudinal direction of the cable 10 is substantially a circle.

The housing 4 is formed of, e.g., a synthetic resin but may be formed of, e.g., a metal such as aluminum alloy. The housing 4 has an inlet hole 40 into which the sheath 3 accommodating the pair of power lines 21 and the pair of signal lines 22 is inserted, a first outlet hole 41 for the pair of power lines 21 to extend out, and a second outlet hole 42 for the pair of signal lines 22 to extend out.

The housing 4 is configured that a direction of the electric wires extending from the first outlet hole 41 is different from a direction of the electric wires extending from the second outlet hole 42. In the present embodiment, the direction of the pair of power lines 21 extending from the housing 4 is parallel to the insertion direction of the sheath 3 into the housing 4, and the direction of the pair of signal lines 22 extending from the housing 4 is inclined (intersects) with respect to the direction of the pair of power lines 21 extending from the housing 4. The pair of signal lines 22 are bent inside the housing 4 at an angle corresponding to the inclination. Due to the inclination of the electric wire extending direction, the pair of power lines 21 and the pair of signal lines 22 can be easily routed in a wheel-well of the automobile.

The wire seal members 5 are formed of a rubber and seal between the electric wires 2 and the housing 4 to prevent liquid such as water from entering the inside of the housing 4 along the electric wires 2. A first wire seal member 51 and a second wire seal member 52 are provided as the wire seal members 5. The first wire seal member 51 is arranged in the first outlet hole 41 so as to be interposed between the housing 4 and the pair of power lines 21, and is in elastic contact with the inner surface of the housing 4 and with the outer circumferential surfaces of the pair of power lines 21. The second wire seal member 52 is arranged in the second outlet hole 42 so as to be interposed between the housing 4 and the pair of signal lines 22, and is in elastic contact with the inner surface of the housing 4 and with the outer circumferential surfaces of the pair of signal lines 22. The first and second wire seal members 51 and 52 prevent water,
etc., from entering the inside of the housing 4 through a gap between the housing 4 and the pair of power lines 21 and a gap between the housing 4 and the pair of signal lines 22.

The housing 4 has plural locking protrusions 43 provided to lock the first wire seal member 51. Each locking protrusion 43 has a shaft-shaped portion 431 and a locking portion 432 having a larger diameter than the shaft-shaped portion 431, and is configured that the shaft-shaped portion 431 rises upright from an opening end face 41a of the first outlet hole 41. The first wire seal member 51 has a main body 511 arranged inside the first outlet hole 41 and a flange 512 facing the opening end face 41a of the first outlet hole 41. The shaft-shaped portion 431 is inserted through a through-hole 510 formed on the flange 512 and the locking portion 432 locks the first wire seal member 51.

The housing 4 also has plural locking protrusions 44 provided to lock the second wire seal member 52. Each locking protrusion 44 has a shaft-shaped portion 441 and a locking portion 442 having a larger diameter than the shaft-shaped portion 441, and is configured that the shaft-shaped portion 441 rises upright from an opening end face 42a of the second outlet hole 42. The second wire seal member 52 has a main body 521 arranged inside the second outlet hole 42 and a flange 522 facing the opening end face 42a of the second outlet hole 42. The shaft-shaped portion 441 is inserted through a through-hole 520 formed on the flange 522 and the locking portion 442 locks the second wire seal member 52.

The holder 6 is formed of an elastic body more flexible than the sheath 3, such as rubber, and has a cylindrical shape. The holder 6 integrally has a small diameter cylindrical portion 61 having an inner circumferential surface in elastic contact with the outer circumferential surface of the sheath 3, a large diameter cylindrical portion 62 accommodating the housing 4 and having an inner circumferential surface in elastic contact with the outer circumferential surface of the housing 4, and a wall portion 63 between the small diameter cylindrical portion 61 and the large diameter cylindrical portion 62. The small diameter cylindrical portion 61 is one form of the sheath-side cylinder portion of the invention, and the large diameter cylindrical portion 62 is one form of the housing-side cylinder portion of the invention.

The large diameter cylindrical portion 62 has larger inner and outer diameters than the small diameter cylindrical portion 61 and is arranged around an end portion of the housing 4 on the inlet hole 40 side. Meanwhile, the small diameter cylindrical portion 61 has an annular protruding wall 611 axially facing the wall portion 63 with a gap therebetween and is configured that the outer circumferential surface on the end side (the end opposite to the wall portion 63) relative to the protruding wall 611 is formed as a tapered surface and becomes gradually narrower toward the end. The outer diameter of the small diameter cylindrical portion 61 is uniform in the axial direction from the protruding wall 611 to the wall portion 63. In a plane perpendicular to the cable longitudinal direction, an area encircled by the inner circumferential surface of the large diameter cylindrical portion 62 is larger than an area encircled by the inner circumferential surface of the small diameter cylindrical portion 61.

The shape of the inner circumferential surface of the small diameter cylindrical portion 61 is a circle so as to match the outer shape of the sheath 3. However, in case that the outer shape of the sheath 3 is a square or an ellipse, etc., the shape of the inner circumferential surface of the small diameter cylindrical portion 61 can be changed to a square or an ellipse, etc., so as to match the shape of the sheath 3.

Meanwhile, the shape of the inner circumferential surface of the large diameter cylindrical portion 62 in the present embodiment is a circle so as to match the outer shape of the housing 4 which has a substantially circular cross-sectional shape. However, in case that the outer shape of the housing 4 is a square or an ellipse, etc., the shape of the inner circumferential surface of the large diameter cylindrical portion 62 can be changed to a square or an ellipse, etc.

The diameter of the inner circumferential surface of the small diameter cylindrical portion 61 in the natural state before attachment to the sheath 3 is smaller than the outer diameter of the sheath 3. The small diameter cylindrical portion 61 is fitted around the sheath 3 while using air, etc., to enlarge the diameter of the small diameter cylindrical portion 61. After fitting, the enlarged diameter of the small diameter cylindrical portion 61 is reduced and the small diameter cylindrical portion 61 elastically comes into contact with the outer circumferential surface of the sheath 3. Thus, a tightening force of the small diameter cylindrical portion 61 (hereinafter, referred to as "a squeezing force") acts on the sheath 3. Due to such squeezing force, the holder 6 is restricted from moving in the longitudinal direction of the cable 10.

The fixing member 7 is clamped on the holder 6 so as to be positioned on the outer side of the sheath 3. In more detail, the fixing member 7 has a tightening portion 71 which is clamped onto the small diameter cylindrical portion 61 between the protruding wall 611 and the wall portion 63. In the present embodiment, the fixing member 7 is formed by bending a rectangular metal sheet and has, at one end, a bolt insertion hole 70 for inserting a bolt used to fix to a mounting object such as automobile body. The fixing member 7 is not shown in FIGS. 3A and 3B. The tightening portion 71 formed at an end portion of the fixing member 7 opposite to the end portion with the bolt insertion hole 70 is curved to wrap around the small diameter cylindrical portion 61 of the holder 6 and squeezes the small diameter cylindrical portion 61 against the sheath 3.

First Pressing Member 8 and Second Pressing Member 9

The wire harness 1 is provided with a first pressing member 8 which presses the large diameter cylindrical portion 62 toward the housing 4 and thereby fixes the large diameter cylindrical portion 62 to the housing 4. A squeezing force acts between the small diameter cylindrical portion 61 and the sheath 3 due to an elastic contact between the small diameter cylindrical portion 61 and the outer surface of the sheath 3 and restricts the holder 6 from moving in the cable longitudinal direction. Since the large diameter cylindrical portion 62 in this state is fixed to the housing 4 by the first pressing member 8, movement of the housing 4 in the cable longitudinal direction is also restricted via the holder 6. This reduces a possibility of misalignment of the housing 4 relative to the cable 10 or detachment of the housing 4 from the cable 10 even under the condition that the electric wires 2 of the cable 10 are pulled or vibrated, and it is thus possible to prevent a decrease in water-stopping properties to stop water entering the inside of the sheath 3.

In the present embodiment, the first pressing member 8 is formed in an annular shape wrapped around the large diameter cylindrical portion 62 and presses the entire circumference of the large diameter cylindrical portion 62 toward the housing 4 to prevent liquid from entering the inside of the housing 4 through a gap between the large diameter cylindrical portion 62 and the housing 4. This means that water-stopping properties between the sheath 3 and the holder 6 are ensured by a squeezing force of the small diameter cylindrical portion 61 and, at the same time, water-stopping properties between the housing 4 and the holder 6 are ensured by the first pressing member 8. Therefore, it is possible to further prevent liquid from entering the inside of the housing 4 and to further improve water-stopping properties of the wire harness 1. In the present embodiment, the first pressing member 8 is an ear clamp which is formed by shaping a strip-shaped metal sheet into an annular shape and is configured to be clamped by pinching a portion thereof.

Water-stopping properties could be ensured only by the squeezing force of the large diameter cylindrical portion 62 acting on the housing 4. In this case, however, when the squeezing force is increased to the required level, it may be very difficult to arrange the large diameter cylindrical portion 62 over the housing 4. Since the configuration in the present embodiment is such that the large diameter cylindrical portion 62 is pressed toward the housing 4 by the first pressing member 8, it is possible to ensure enough water-stopping properties even when the squeezing force is reduced to the extent that the large diameter cylindrical portion 62 is easily arranged over the housing 4, which means that this configuration also contributes to improvement in assembling workability.

The wire harness 1 in the present embodiment is further provided with a second pressing member 9 which presses the small diameter cylindrical portion 61 toward the sheath 3 and thereby fixes the small diameter cylindrical portion 61 to the sheath 3. The second pressing member 9 also serves to seal between the small diameter cylindrical portion 61 and the sheath 3 and thereby prevents liquid from entering the inside of the housing 4 through a gap between the small diameter cylindrical portion 61 and the sheath 3. In the present embodiment, the second pressing member 9 is the tightening portion 71 of the fixing member 7. In other words, in the present embodiment, the fixing member 7 also has a function as the second pressing member 9. This configuration reduces the number of components as compared to when providing the second pressing member 9 separately from the fixing member 7 and thus contributes to the cost reduction of the wire harness 1.

By providing the second pressing member 9 (the tightening portion 71 in this example), it is possible to sufficiently restrict axial movement of the holder 6 relative to the cable 10 even when the squeezing force of the small diameter cylindrical portion 61 pushing against the sheath 3 is relatively low. Since providing the second pressing member 9 also increases adhesion between the inner circumferential surface of the small diameter cylindrical portion 61 and the outer circumferential surface of the sheath 3, it is possible to further prevent water from entering the inside of the housing 4. As a result, it is not necessary to separately provide a sealing member (rubber plug, etc.) between the housing 4 and the sheath 3 to seal a gap therebetween, hence, it is possible to reduce the size of the wire harness 1, and in addition, the cost can be reduced since the number of components is reduced.

In the present embodiment, the holder 6 is formed of an ethylene propylene diene (EPDM) rubber. Since compression set is less likely to occur in the ethylene propylene diene rubber than in the thermoplastic urethane used to form the sheath 3, it is possible to firmly press the small diameter cylindrical portion 61 against the sheath 3 by the second pressing member 9. As such, the holder 6 is desirably formed of a material in which compression set is less likely to occur than in the sheath 3.

In addition, the holder 6 preferably has a lower hardness than the sheath 3. The holder 6 has a Shore hardness A of, e.g., 60 and the sheath 3 has a Shore hardness A of, e.g., 80. By using the holder 6 which has a lower hardness than the sheath 3, damage such as cracks on the sheath 3 due to, e.g., friction with the holder 6 can be prevented even when, e.g., the cable 10 is vibrated or bent, and it is thus possible to prevent damage to the cable 10.

Modification

Figure 8:
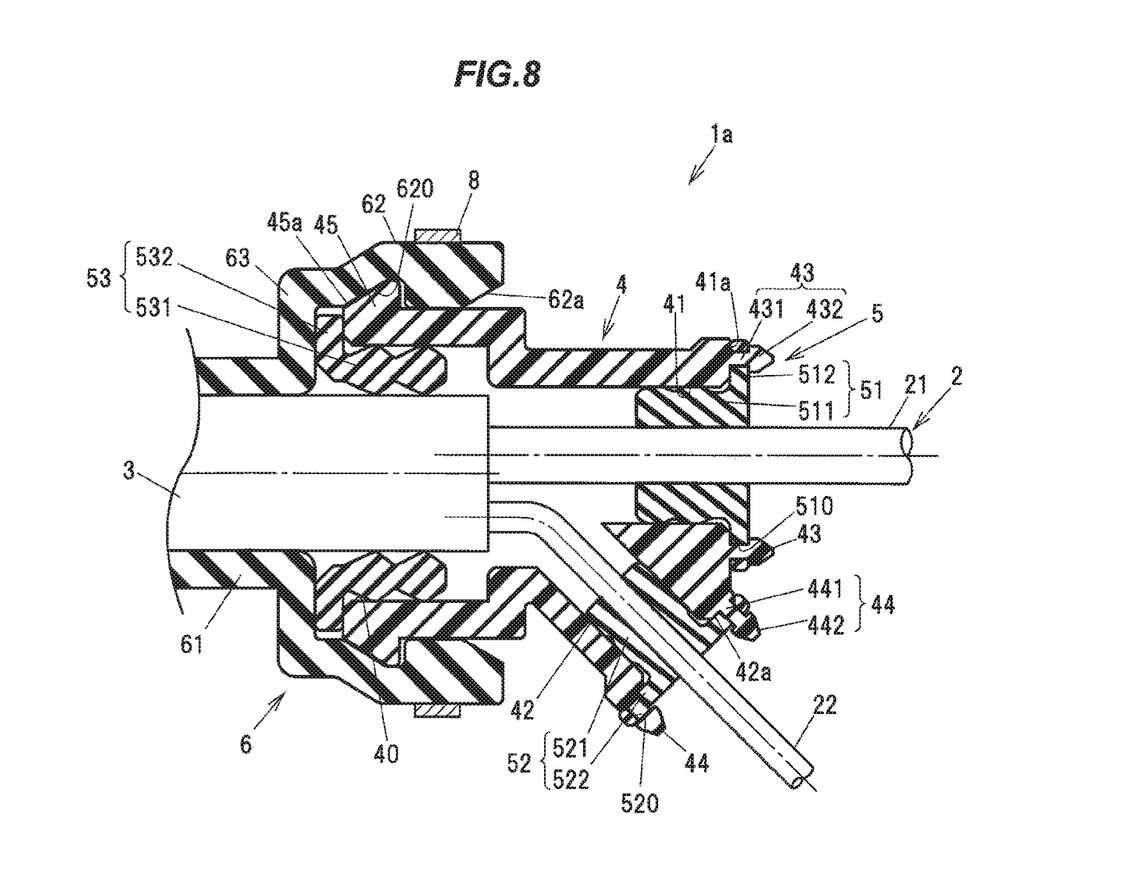
FIG. 8 is a cross sectional view showing the main portion of the wire harness in a modification of the invention.

A wire harness 1a shown in FIG. 8 is based on the wire harness 1 but additionally has a mechanism to lock the housing 4 to the holder 6. In the wire harness 1a, an engaging portion provided on one of the housing 4 and the holder 6 engages an engaged portion provided on the other of the housing 4 and the holder 6, and the housing 4 is thereby restricted from moving in the longitudinal direction of the cable 10. In FIG. 8, an annular engagement protrusion 45 as the engaging portion is formed on the outer surface of the housing 4 at the end on the inlet hole 40 side, while an annular engagement groove 620 as the engaged portion is formed on the inner surface of the large diameter cylindrical portion 62 of the holder 6 and engages the engagement protrusion 45.

When causing engagement between the engagement protrusion 45 of the housing 4 and the engagement groove 620, the large diameter cylindrical portion 62 of the holder 6 is elastically deformed to enlarge the diameter and an end portion of the housing 4 is pushed into the large diameter cylindrical portion 62 in the axial direction. The inner circumferential surface of the large diameter cylindrical portion 62 at the end portion on the opening side is formed as a tapered inner circumferential surface 62a of which inner diameter increases with an increase in an axial distance from the engagement groove 620. On the other hand, the outer circumferential surface of the engagement protrusion 45 of the housing 4 is formed as a tapered outer circumferential surface 45a which butts against the tapered inner circumferential surface 62a of the holder 6. When causing engagement between the engagement protrusion 45 of the housing 4 and the engagement groove 620, the tapered outer circumferential surface 45a butts against the tapered inner circumferential surface 62a and the large diameter cylindrical portion 62 is thereby enlarged in diameter.

Due to the engagement between the large diameter cylindrical portion 62 and the housing 4, the housing 4 and the holder 6 are fixed to each other more firmly and movement of the housing 4 in the longitudinal direction of the cable 10 is further restricted. Thus, it is possible to prevent separation of the housing 4 from the holder 6 and this further prevents water from entering the inside of the housing 4 through a gap formed by separation of the housing 4.

In the wire harness 1a, the first pressing member 8 is arranged so that the large diameter cylindrical portion 62 on the opening side relative to the engaging or engaged portion (the engagement groove 620 in this example) of the holder 6, i.e., on the side opposite to the small diameter cylindrical portion 61, is pressed toward the housing 4. Since the first pressing member 8 is arranged on the opening side relative to the engagement groove 620, engagement between the engagement groove 620 and the engagement protrusion 45 is less likely to be released due to pressure from the first pressing member 8, and the housing 4 and the holder 6 are thereby fixed to each other more firmly.

FIG. 8 shows an example of further providing a sheath-side seal member 53 which is arranged in the inlet hole 40 to seal between the housing 4 and the sheath 3. The sheath-side seal member 53 is interposed between the housing 4 and the sheath 3 and is in elastic contact with the inner surface of the housing 4 and with the outer circumferential surface of the sheath 3. The sheath-side seal member 53 has a main body 531 arranged inside the inlet hole 40 of the housing 4 and a flange 532 which protrudes outward from the main body 531 and is sandwiched between the wall portion 63 of the holder 6 and an end portion of the housing 4 on the inlet hole 40 side. When having both the first pressing member 8 and the second pressing member 9, enough water-stopping properties are ensured by the two pressing members 8 and 9 and the sheath-side seal member 53 thus can be omitted. The fixing member 7 (the second pressing member 9) is not shown in FIG. 8.

Functions and Effects of the Embodiments

As described above, the wire harness 1 or 1a in the present embodiment is provided with the holder 6, which is formed of an elastic body and integrally has the small diameter cylindrical portion 61 formed in a cylindrical shape having an inner circumferential surface in contact with the outer circumferential surface of the sheath 3 and the large diameter cylindrical portion 62 in contact with the outer circumferential surface of the housing 4, and the first pressing member 8 which presses the large diameter cylindrical portion 62 toward the housing 4 and thereby fixes the large diameter cylindrical portion 62 to the housing 4.

In this configuration, since the housing 4 is fixed to the cable 10 via the holder 6, it is possible to reduce a possibility of detachment of the housing 4 from the cable 10 even under vibration and a decrease in water tightness due to misalignment of the position of housing 4 is prevented. As a result, it is possible to prevent a negative impact of water which enters, e.g., a gap between the sheath 3 and the electric wires 2.

SUMMARY OF THE EMBODIMENTS

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A wire harness (1), comprising: a cable (10) that comprises electric wires (2) and a sheath (3) covering the electric wires (2) and is arranged so that the electric wires (2) are exposed from an end portion of the sheath (3); a housing (4) that accommodates the electric wires (2) exposed from the end portion of the sheath (3); wire seal members (5) arranged inside the housing (4) to seal between the electric wires (2) and the housing (4); a holder (6) that comprises an elastic body, a cylindrical sheath-side cylinder portion (61) comprising an inner circumferential surface in contact with an outer circumferential surface of the sheath (3), and a cylindrical housing-side cylinder portion (62) in contact with an outer circumferential surface of the housing (4), the sheath-side cylinder portion (61) and the housing-side cylinder portion (62) being integrally formed; and a first pressing member (8) that presses the housing-side cylinder portion (62) toward the housing (4) and thereby fixes the housing-side cylinder portion (62) to the housing (4).

[2] The wire harness (1) according to [1], wherein the first pressing member (8) is formed in an annular shape wrapped around the housing-side cylinder portion (62) and presses the housing-side cylinder portion (62) toward the housing (4) to prevent liquid from entering the inside of the housing (4) through a gap between the housing-side cylinder portion (62) and the housing (4).

[3] The wire harness (1) according to [2], further comprising: a second pressing member (9) that presses the sheath-side cylinder portion (61) toward the sheath (3) and thereby fixes the sheath-side cylinder portion (61) to the housing (3).

[4] The wire harness (1) according to [3], further comprising a fixing member (7) that is provided for fixing the cable (10) to a fixing target and comprises a tightening portion (71) clamped onto the sheath-side cylinder portion (61), wherein the second pressing member (9) comprises the tightening portion (71) of the fixing member (7).

[5] The wire harness (1) according to any one of [1] to [4], wherein the holder (6) has a lower hardness than the sheath (3).

[6] The wire harness (1) according to [5], wherein the holder (6) comprises an ethylene propylene diene rubber, and the sheath (3) comprises a thermoplastic urethane.

[7] The wire harness (1) according to any one of [1] to [6], wherein a plurality of the electric wires (2) are housed in the sheath (3), wherein the housing (4) comprises a first outlet hole (41) for some of the plurality of electric wires (2) to extend out and a second outlet hole (42) for the other electric wires (2) to extend out and is configured that a direction of the electric wires extending from the first outlet hole (41) is different from a direction of the electric wires extending from the second outlet hole (42), and wherein the wire seal members (5) are respectively arranged in the first outlet hole (41) and the second outlet hole (42).

[8] The wire harness (1a) according to any one of [1] to [7], wherein an engaging portion (45) provided on one of the housing (4) and the housing-side cylinder portion (62) of the holder (6) engages an engaged portion (620) provided on an other of the housing (4) and the housing-side cylinder portion (62) of the holder (6), wherein the engagement between engaging portion (45) and the engaged portion (620) restricts the housing (4) from moving in a longitudinal direction of the cable (10), and wherein the first pressing member (8) is arranged so that the housing-side cylinder portion (62) on the opening side relative to the engaging portion (45) or the engaged portion (620) of the holder (6) is pressed toward the housing (4).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist of the present invention. For example, although the example of using two pressing members, the first pressing member 8 and the second pressing member 9, has been described in the embodiment, the first pressing member 8 and the second pressing member 9 may be integrated. The configuration may be such that, e.g., a cylindrical pressing member formed of resin or metal harder than the holder 6 is provided to press both the small diameter cylindrical portion 61 and the large diameter cylindrical portion 62.

The invention claimed is:

1. A wire harness, comprising:
a cable that comprises electric wires and a sheath covering the electric wires and is arranged so that the electric wires are exposed from an end portion of the sheath;
a housing that accommodates the electric wires exposed from the end portion of the sheath;
wire seal members arranged inside the housing to seal between the electric wires and the housing;
a holder that comprises an elastic body, a cylindrical sheath-side cylinder portion comprising an inner circumferential surface in contact with an outer circumferential surface of the sheath, and a cylindrical housing-side cylinder portion in contact with an outer circumferential surface of the housing, the sheath-side cylinder portion and the housing-side cylinder portion being integrally formed; and
a first pressing member that presses the housing-side cylinder portion toward the housing and thereby fixes the housing-side cylinder portion to the housing,
wherein, in a cross-sectional view, two cylindrical portions extend between opposing sides of the outer circumferential surface of the housing to accommodate the seal members;
wherein the two cylindrical portions merge out in different directions from the outer circumferential surface of the housing to accommodate the seal members;
wherein the connecting portion connecting the front of each of the two cylindrical portions; and one locking protrusion in one of two cylindrical portions and another locking protrusion in another of the two cylindrical portions are attached to a front surface of the two cylindrical portions at opposite ends of the connecting portion.

2. The wire harness according to claim 1, wherein the first pressing member is formed in an annular shape wrapped around the housing-side cylinder portion and presses the housing-side cylinder portion toward the housing to prevent liquid from entering the inside of the housing through a gap between the housing-side cylinder portion and the housing.

3. The wire harness according to claim 2, further comprising:
a second pressing member that presses the sheath-side cylinder portion toward the sheath and thereby fixes the sheath-side cylinder portion to the housing.

4. The wire harness according to claim 3, further comprising a fixing member that is provided for fixing the cable to a fixing target and comprises a tightening portion clamped onto the sheath-side cylinder portion,
wherein the second pressing member comprises the tightening portion of the fixing member.

5. The wire harness according to claim 1, wherein the holder has a lower hardness than the sheath.

6. The wire harness according to claim 5, wherein the holder comprises an ethylene propylene diene rubber, and wherein the sheath comprises a thermoplastic urethane.

7. The wire harness according to claim 1, wherein a plurality of the electric wires are housed in the sheath,
wherein the housing comprises a first outlet hole for some of the plurality of electric wires to extend out and a second outlet hole for other electric wires to extend out and is configured that a direction of the electric wires extending from the first outlet hole is different from a direction of the electric wires extending from the second outlet hole, and
wherein the wire seal members are respectively arranged in the first outlet hole and the second outlet hole.

8. The wire harness according to claim 1, wherein an engaging portion provided on one of the housing and the housing-side cylinder portion of the holder engages an engaged portion provided on an other of the housing and the housing-side cylinder portion of the holder,
wherein the engagement between the engaging portion and the engaged portion restricts the housing from moving in a longitudinal direction of the cable, and
wherein the first pressing member is arranged so that the housing-side cylinder portion on the opening side relative to the engaging or engaged portion of the holder is pressed toward the housing.

9. The wire harness according to claim 1, wherein the seal members are disposed between the two cylindrical portions.

10. The wire harness according to claim 1, wherein, in the cross-sectional view, one of a part of one of the seat members is disposed between a side of the sides of the outer circumferential surface of the housing and one of the two cylindrical portions.

11. The wire harness according to claim 10, wherein, in the cross-sectional view, another one of the seal members is disposed between another side of the sides of the outer circumferential surface of the housing and another one of the two cylindrical portions.

12. The wire harness according to claim 11, wherein, in the cross-sectional view, a part of the one of the seal members and a part of the another one of the seal members are disposed between the two cylindrical portions.

13. The wire harness according to claim 11, wherein, in the cross-sectional view, a locking protrusion is disposed between the one of the seal members and the another one of the seal members.

14. The wire harness according to claim 13, wherein the locking protrusion includes a shaft-shaped portion and a locking portion having a larger diameter than the shaft-shaped portion to lock the one of the seal members.

15. The wire harness according to claim 1, wherein the two cylindrical portions extend between an area between the opposing sides of the outer circumferential surface of the housing.

16. The wire harness according to claim 1, wherein an axial direction of one of the two cylindrical portions extends parallel to an axial direction of the housing.

17. The wire harness according to claim 16, wherein an axial direction of another one of the two cylindrical portions is inclined with respect to the axial direction of the housing.

18. The wire harness according to claim 17, wherein an area between the opposing sides of the outer circumferential surface of the housing is filled with the two cylindrical portions.

19. The wire harness according to claim 4, wherein the fixing member includes a bolt insertion hole for inserting a bolt.

* * * * *